United States Patent [19]

Donges et al.

[11] Patent Number: 4,759,047
[45] Date of Patent: Jul. 19, 1988

[54] BAGGAGE INSPECTION SYSTEM

[75] Inventors: Gerhard Donges, Heidenrod; Rolf Dietrich, Hofheim, both of Fed. Rep. of Germany

[73] Assignee: Heimann GmbH, Fed. Rep. of Germany

[21] Appl. No.: 886,899

[22] Filed: Jul. 17, 1986

[30] Foreign Application Priority Data

Aug. 29, 1985 [DE] Fed. Rep. of Germany ....... 3530938

[51] Int. Cl.$^4$ .................... G01N 23/04; A61B 6/02
[52] U.S. Cl. ........................................ 378/57; 378/58; 378/99
[58] Field of Search .................. 378/57, 58, 99, 19, 378/62; 250/359.1

[56] References Cited

U.S. PATENT DOCUMENTS

| 3,889,117 | 6/1975 | Shaw, Jr. ............................ 250/332 |
| 4,193,001 | 3/1980 | Liebetruth et al. .................. 378/19 |
| 4,504,962 | 3/1985 | Moore ................................. 378/19 |

FOREIGN PATENT DOCUMENTS

| 0077939 | 4/1983 | European Pat. Off. . |
| 3229913 | 3/1984 | Fed. Rep. of Germany . |

OTHER PUBLICATIONS

"Principles, History, and Status of Dual-Energy Computerized Tomographic Explosives Detection," Roder, 8262 Journal Of Testing and Evaluation, vol. 13, No. 3, (May 1985).

"A Survey of X-ray Technology and Available Systems for Parcel Inspection", Cumings, Carnahan, Conference on Crime Countermeasures, May 16–18, 1979.

"Portal Monitor Detects Nuclear Radiation and Materials," Technical Information Center, U.S. Department of Energy.

*Primary Examiner*—Carolyn E. Fields
*Assistant Examiner*—Joseph A. Hynds
*Attorney, Agent, or Firm*—Hill, Van Santen, Steadman & Simpson

[57] ABSTRACT

A baggage inspection system has a conveying path for moving articles to be inspected through an x-ray beam. The conveyor path is disposed between an x-ray source for generating the beam and a radiation detector. The radiation detector consists of a number of individual detectors, with the number of individual detectors per unit length being greater in a first region of the detector than in a second region thereof. The first region is disposed at the level of the conveying path for optimally displaying smaller articles transported by the conveyor path, while the second region is suited for display of larger articles.

5 Claims, 2 Drawing Sheets

1

BAGGAGE INSPECTION SYSTEM

BACKGROUND OF THE INVENTION

1. Field of the Invention

The present invention relates to baggage inspection systems, and in particular to such systems having a conveyor path for transporting articles through an x-ray beam.

2. Description of the Prior Art

Baggage inspection systems are common, wherein a moving conveyor transports articles between an x-ray source and a radiation detector for inspecting the articles by means of an x-ray beam generated by the source. The articles are moved by the conveyor at a defined speed and are scanned in strips. Samples are acquired by integrating the signals from individual detectors comprising the radiation detector, with the number of such samples depending upon the number of individual detectors within a given row. The samples are converted into digital form and are written into a memory, and are then used to compile a video image of the article. Inspection of the article is then undertaken on a monitor which may, for example, comprise 576 lines in accordance with the European video standard. The signal for an individual detector is represented on the monitor by one line, so that the number of individual detectors is accordingly limited to 576.

The row-shaped radiation detectors are not subject to limitation as to length and shape, so that this technology is utilized in an increasing degree by employing very long rows for transilluminating articles, such as baggage articles, having extremely large dimensions.

Such rows are generally formed by a plurality of structurally identical modules, which contain a selected plurality of individual detectors arranged in one row at uniform intervals in accordance with their dimensions. A grid dimension is thus selected such that the number of individual detectors required for constructing a row having a defined length optimally corresponds to the number of active, evaluatable individual detectors. Rows having a large grid dimension are therefore utilized in systems for inspecting large baggage articles.

An image scale is thus achieved, wherein the monitor is completely fully written in the vertical direction given an expected maximum size of the articles to be inspected.

If these systems are also employed for transilluminating smaller articles, the x-ray image of the smaller article fills only a very small portion of the picture screen.

SUMMARY OF THE INVENTION

It is an object of the present invention to provide a baggage inspection system, wherein articles are conveyed through an x-ray beam in which articles having smaller dimensions are displayed in a scale favorable for viewing such smaller articles while still retaining capability for transilluminating and displaying larger articles.

The above object is achieved in accordance with the principles of the present invention by providing a radiation detector having a first region, wherein the number of individual detectors per unit length is greater than the number of individual detectors per unit length in a second region of the radiation detector. The first region is disposed at a level corresponding to the level of the conveyor path on which the articles are transported. The individual detectors having smaller spacings therebetween are thus disposed at that portion of the radiation detector on which x-rays will be incident which have transilluminated smaller articles on the conveyor path. The number of individual detectors employed in this portion of the radiation detector is increased, however, the necessity for modifying the imaging scale for such smaller articles is not present.

In a further embodiment of the baggage inspection system disclosed herein, each individual detector has an integrator allocated thereto for integrating an electrical signal from the individual detector corresponding to the received radiation intensity, as well as a read-out circuit for each integrator. The read-out circuit is constructed such that the integrators allocated to the individual detectors in the first region of the radiation detector can be optionally read-out rapidly or slowly. This is accomplished upon recognition that for successive read-out of n individual detectors of the first region, only that time which corresponds to the integration time of the individual detectors of the second region (fixed in accordance with the conveyor speed) is available for read-out.

The increase in the number of individual detectors per unit length can be undertaken such that all individual detectors of the first region are placed on an angle relative to the central ray of the radiation beam.

DESCRIPTION OF THE PREFERRED EMBODIMENTS

Figure 1:
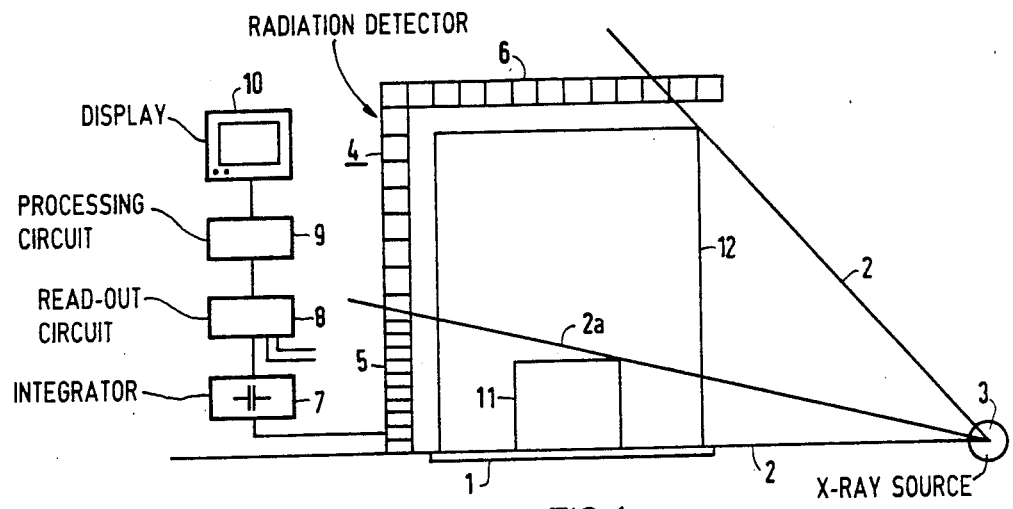
FIG. 1 is an end view of a baggage inspection system constructed in accordance with the principles of the present invention with the associated circuitry being schematically illustrated.

A baggage inspection system constructed in accordance with the principles of the present invention as schematically shown in FIG. 1. The system includes a conveyor path 1 formed, for example, by a conveyor belt moving in a plane perpendicularly to the plane of the drawing. Articles to be inspected are moved along the conveyor path 1 in a direction perpendicular to a fan-shaped x-ray beam 2, the beam 2 being in the plane of the drawing. The x-ray beam 2 is generated by an x-ray source 3 and is incident on an angled radiation detector 4. The radiation detector 4 has a first region 5 and a second region 6, with the detector density, i.e., the number of individual detectors per unit length, being greater in the first region 5 and in the second region 6. The first region 5 is disposed at the level of the conveyor path 1.

Each individual detector of the radiation detector 4' has an integrator for operating on an electrical signal from the individual detector corresponding to the received radiation intensity. One such integrator 7 is shown in FIG. 1 for one individual detector. Each integrator 7 has a read-out circuit 8 connected thereto for controlling transfer of signals to a processing circuit 9 in which a visual image is compiled. The generated image is reproduced on a display 10.

As can be seen in FIG. 1, a small article 11 and a large article 12 are shown on the conveyor path 1. In transillumination of the small article 11, the x-ray beam 2a containing image information is incident on the region 5, whereas the x-ray beam 2 transilluminating the large article 12 is incident on both regions 5 and 6 of the radiation detector 4. The region 6 is angled as shown in FIG. 1 so as to encompass the entire examination chamber.

As seen in the trace direction, the imaging scale on the display 10 is dependent upon the scan rate of the read-out circuit 8 and on the moving speed of the articles being inspected. Perpendicular to the trace direction, the imaging scale is determined by the grid dimension of the radiation detector 4. In order to avoid geometrical distortion, both imaging scales must roughly coincide.

In order to meet these requirements in the system disclosed herein, it is preferable to select the grid dimension for the second region 6 which may, for example, be in the form of a large-area diode line, as a whole multiple n of the grid dimension of the first region 5 which may, for example, be formed by a small diode line. Matching of the imaging scales can then be undertaken electronically.

The number of individual detectors in the region 5 can preferably be 576 or a multiple thereof so that the number of individual detectors in the region 6 is 576 (1-1/n).

For normal representation of large articles, the individual signals from the individual detectors of the region 5 are combined such that the sum of the channels read into a memory corresponds to the applicable video standard. This is achieved by summing the measured values of all of the channels of the region 5. Normalization of the signals is achieved by the scaling operation.

The measured values of the region 5 must be read out faster by a factor corresponding to the number of such values because only that time which corresponds to the integration time of an individual detector in the region 6 (fixed by the conveyor speed) is available for read-out of the number of individual detectors in the region 5.

Only the signals for the individual detectors of the region 5 are used in the transillumination of small articles. In this operating mode, every individual detector operates as an active element and supplies output information for one line on the monitor 10. In order to avoid geometrical distortion, signal acquisition must be undertaken with an integration time which is smaller by a factor corresponding to the number of individual detectors in the region 5 if the conveyor speed is not to be modified for this operating mode. This means that the picture is traced on the monitor with a speed higher by the factor corresponding to the number of detectors of the region 5. For this operating mode, it is also possible to work with a conveyor speed which is lower by the same factor, so that the integration can be retained at the same value.

Figure 2:
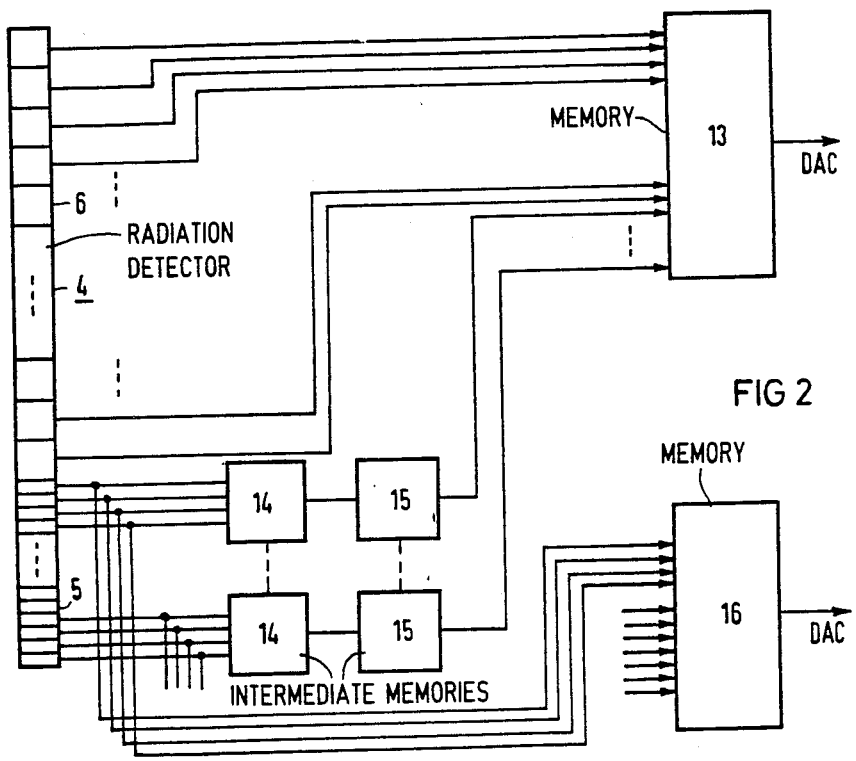
FIG. 2 is a schematic circuit diagram of a portion of the circuitry shown in FIG. 1.

A schematic illustration of an electron circuit for switching between the two operating modes is shown in FIG. 2.

For large articles to be inspected, the signals from the 576 (1-1/n) elements of the region 6 shown elongated in FIG. 2 are entered directly into a memory 13 with a 576×520×8 field. The signals are entered therein after processing in a line processor and conversion to digital form. The signals of the region 5, which are available in a number greater by a factor m than required, are summed in 576/m intermediate memories 14, and signals greater by the factor m are supplied to 576/m intermediate memories 15. In the intermediate memories 15, the resulting signals, occurring m times within the integration time of the region 6 due to the integration time which is shorter by the factor m, are also summed and are subsequently supplied to the memory 13 used for representing large articles.

When an operater switches the system to a small article inspection mode, the signals of all individual detectors of the reigon 5 are entered into a memory 16 in a 576×520×8 field. The signals are written directly therein with a clock rate which is m times higher if the same conveyor belt speed is retained.

When small article inspection is undertaken using a conveyor speed which is lower by the factor m, a shortening of the integration time of the region 5 by the factor m is eliminated, and the signals are written into the memory 16 with the normal clock.

Figure 3:
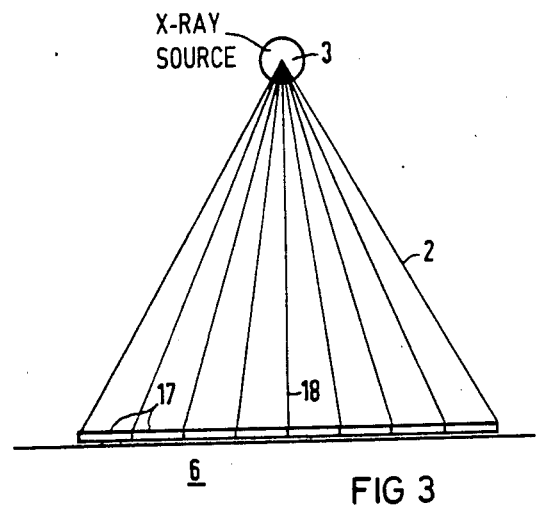
FIG. 3 is a schematic representation of the arrangement of the individual detectors in the portion of the radiation detector for large article image generation.
Figure 4:
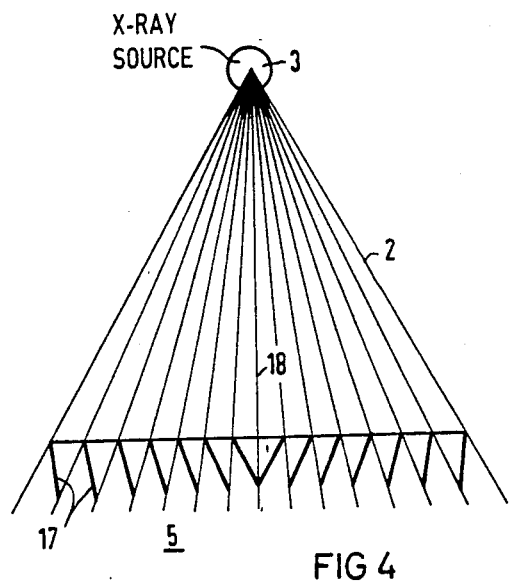
FIG. 4 is a schematic representation of one embodiment for arrangement of the individual detectors in the portion of the radiation detector for small article image generation.

An arrangement of the individual detectors on printed circuit boards in the respective regions 5 and 6 is shown in FIGS. 3 and 4. In each Figure, the printed circuit boards carrying the individual detectors are references 17. All printed circuit boards 17 have the same dimensions. The region 6, having the larger grid dimension, is constructed as shown in FIG. 3 with all printed circuit boards 17 being disposed in a row extending perpendicularly to a central ray 18 of the x-ray beam 2. As shown in FIG. 4, the effective grid for region 5 is made smaller by placing the printed circuit boards 17 at an angle with respect to the ray 18. If the printed circuit boards 17 are inclined by an angle of, for example, 60° relative to the incident radiation, an effective grid dimension of one half of the grid dimension in FIG. 3 results. Twice the number of individual detectors can thus be accomodated within the same row length. It is important for the embodiment of FIG. 4 that the individaul detectors are placed at an angle relative to the central ray 18 of the radiation beam 2, i.e., an angle other than 90°.

Although modifications and changes may be suggested by those skilled in the art it is the intention of the inventors to embody within the patent warranted hereon all changes and modifications as reasonably and properly come within the scope of their contribution to the art.

We claim as our invention:

1. An article inspection system for inspecting a series of articles of randomly varying size comprising:
    an x-ray source for generating a stationary x-ray beam;
    a conveyor means for moving articles of respectively different sizes along a plane through said x-ray beam for penetration of said articles by at least a portion of said x-ray beam;
    a single angled radiation detector row disposed for detecting radiation passing through said articles on said conveyor means, said angled radiation detector row consisting of a plurality of individual detectors and having a first region and a second region, the individual detectors per unit length in each region of said angled radiation detector row being fixed and in said first region being greater than the individual detectors per unit length in said second region, and said first region of said radiation detector row being disposed at a level which is closer to the level of said plane than is said second region; and means for generating a visible image of said articles from signals received from said angled radiation detector row.

2. An article inspection system as claimed in claim 1, wherein said means for generating a visible image includes a plurality of integrators respectively connected to said individual detectors of said single angled radiation detector row, and a read-out circuit connected to said integrators including means for optionally reading out said integrators at different rates.

3. An article inspection system as claimed in claim 1, wherein said x-ray source has a central ray, and wherein said individual detectors in said first region are disposed at an angle relative to said central ray other than 90°.

4. An article inspection system for inspecting a series of articles of randomly varying size comprising:

an x-ray source for generating a stationary x-ray beam;

a conveyor means for moving articles of respectively different sizes along a plane through said x-ray beam for penetration of said articles by at least a portion of said x-ray beam;

a single angled radiation detector row disposed for detecting radiation passing through said articles on said conveyor means, said angled radiation detector row consisting of a first region and a second region, each of said first and second regions including identical individual radiation detectors, said first region having a fixed individual radiation detector density which is greater than a fixed radiation detector density of said second region, said first region being disposed closer to the level of said plane than said second region; and means for generating a visible image of said articles from signals received from said first and second regions.

5. An article inspection system for inspecting a series of articles of randomly varying size comprising:

an x-ray source for generating a stationary x-ray beam having a central ray;

a conveyor means for moving articles of respectively different sizes along a plane through said x-ray beam for penetration of said articles by at least a portion of said x-ray beam;

a single angled radiation detector row disposed for detecting radiation passing through said articles on said conveyor means, said angled radiation detector row having a first region and a second region with said first region being disposed closer to the level of said plane than said second region, said first region including a fixed plurality of individual detectors disposed at an angle relative to said central ray other than 90° and said second region having a different fixed plurality of individual detectors disposed perpendicularly with respect to said central ray such that said first region has an individual detector density which is greater than an individual detector density of said second region; and means for generating a visible image of said articles from signals received from said first and second regions.

* * * * *